(12) United States Patent
Shilpi

(10) Patent No.: US 12,430,192 B2
(45) Date of Patent: Sep. 30, 2025

(54) BATCH MONITORING TOOL

(71) Applicant: Truist Bank, Charlotte, NC (US)

(72) Inventor: Shubhankar Shilpi, Charlotte, NC (US)

(73) Assignee: Truist Bank, Charlotte, NC (US)

(*) Notice: Subject to any disclaimer, the term of this patent is extended or adjusted under 35 U.S.C. 154(b) by 87 days.

(21) Appl. No.: 18/488,784

(22) Filed: Oct. 17, 2023

(65) Prior Publication Data

US 2025/0123918 A1   Apr. 17, 2025

(51) Int. Cl.
*G06F 11/00* (2006.01)
*G06F 11/07* (2006.01)
*G06F 11/30* (2006.01)

(52) U.S. Cl.
CPC ........ *G06F 11/0766* (2013.01); *G06F 11/302* (2013.01); *G06F 11/30* (2013.01)

(58) Field of Classification Search
CPC ..... G06F 11/0766; G06F 11/302; G06F 11/30
See application file for complete search history.

(56) References Cited

U.S. PATENT DOCUMENTS

| | | | |
|---|---|---|---|
| 10,896,055 B2* | 1/2021 | Sivasubramanian | ... G06F 11/30 |
| 2013/0060933 A1* | 3/2013 | Tung | ... H04L 41/5003 709/224 |
| 2016/0132798 A1* | 5/2016 | Picard | ... G06Q 10/0631 705/7.28 |
| 2016/0217022 A1* | 7/2016 | Velipasaoglu | ... G06F 11/32 |
| 2017/0053258 A1* | 2/2017 | Carney | ... H04L 45/22 |
| 2019/0052547 A1* | 2/2019 | Patel | ... H04L 41/5025 |
| 2020/0004601 A1* | 1/2020 | Ahmad | ... G06F 11/3003 |
| 2020/0012520 A1* | 1/2020 | Bidkar | ... G06F 9/3838 |
| 2023/0011452 A1* | 1/2023 | Barber | ... G06F 16/24558 |
| 2023/0018199 A1* | 1/2023 | Mahamuni | ... G06F 11/3051 |
| 2024/0281359 A1* | 8/2024 | White | ... G06F 11/3409 |
| 2025/0123918 A1* | 4/2025 | Shilpi | ... G06F 11/302 |

* cited by examiner

*Primary Examiner* — Jonathan D Gibson
(74) *Attorney, Agent, or Firm* — Jordan IP Law, LLC; Michael A. Springs, Esq.

(57) ABSTRACT

Systems, apparatuses, and computer-implemented methods provide for technology that identifies schedule data and SLA data associated with a batch of applications, simultaneously monitors jobs associated with the batch of applications for error conditions with respect to one or more of the schedule data or the SLA data, and generates an application status report and a failed job report based on the error conditions.

20 Claims, 8 Drawing Sheets

408

| Job Name | Time and Schedule of run- (ZZZZZZZZ are placeholder for future references) | Time Run | Job Description |
|---|---|---|---|
| AC1043 | 07:00O7:15O0DYYYYNNNNZZZZZZZZTM | 700 | arrival |
| AC1043 | 09:00O9:15O0DYYYYNNNNZZZZZZZZTM | 900 | arrival |
| AC1043 | 11:30O11:45O0DYYYYNNNNZZZZZZZZTM | 1100 | arrival |
| ... | | | |
| AC300 | 02:00O2:30O0DYYYYNNNNZZZZZZZZACH | 200 | WINDOW |
| AC301 | 07:00O8:00O0DYYYYNNNNZZZZZZZZACH | 800 | WINDOW |
| AC302 | 10:00O11:00O0DYYYYNNNNZZZZZZZZACH | 1000 | WINDOW |

| Application | Appl ID | Running status | Failures | Comments |
|---|---|---|---|---|
| TRECS | CR | YES | No | CPR Returns job is completed at 2:36 PM within SLA(2:50 PM) CPR Scrubbing job is completed at 2:38 PM within SLA(2:40 PM) CPR Decisions file from TM job is completed at 2:02 PM within SLA(2:15 PM) CPR TM Daily Paid file job is completed at 2:45 PM within SLA(3:00 PM) CPR OLC Paid File job is completed at 2:41 PM within SLA(3:00 PM) |
| Payments Hub | HU | YES | No | All jobs are running as expected |
| Sunview Treasury Manager | BN | YES | No | CPR Exceptions job is completed at 2:41 PM within SLA(3:00 PM) CPR Decisions File job is completed at 2:01 PM within SLA(2:30 PM) ACH Payments from Treasury Manager - 1400 job is completed at 2:01 PM within SLA(2:15 PM) |
| OLC | OL | YES | No | All jobs are running as expected |
| Integrated Receivables | IR | YES | No | All jobs are running as expected |
| Automated Clearing House | AC | YES | No | ACH 1530 WINDOW job is completed at 78:00 PM but missed SLA(3:00 PM) |
| ORD | OR | YES | No | All jobs are running as expected |

| Job name | Application | Appl ID | Return code | End Time |
|---|---|---|---|---|
| CDDSRG006_PRD | Payments Hub | HUDP05AH.53 | 4 | 13:02:36 |
| CDDSRG007_PRD | Payments Hub | HUDP05AH.53 | 4 | 14:45:21 |
| CDDTSYS006_PRD | Payments Hub | HUDP05R.17 | 4 | 14:39:16 |

FIG. 6B

BATCH MONITORING TOOL

TECHNICAL FIELD

Embodiments generally relate to monitoring the status of software applications. More particularly, embodiments relate to an application batch monitoring tool that provides more effective and accurate reporting.

BACKGROUND

Various industries concurrently execute many different software applications to conduct their respective operations. Manually determining the status of each of the different software applications may be challenging, particularly when each application has different requirements and contains thousands of jobs.

SUMMARY

In one embodiment, a performance-enhanced computing system comprises a network controller, a processor coupled to the network controller, and a memory coupled to the processor, the memory including a set of instructions, which when executed by the processor, cause the processor to identify schedule data and service level agreement (SLA) data associated with a batch of applications, simultaneously monitor jobs associated with the batch of applications for error conditions with respect to one or more of the schedule data or the SLA data, and generate an application status report and a failed job report based on the error conditions.

In another embodiment, at least one computer readable storage medium comprising a set of instructions, which when executed by a computing system, cause the computing system to identify schedule data and service level agreement (SLA) data associated with a batch of applications, simultaneously monitor jobs associated with the batch of applications for error conditions with respect to one or more of the schedule data or the SLA data, and generate an application status report and a failed job report based on the error conditions.

In another embodiment, a method of operating a performance-enhanced computing system comprises identifying schedule data and service level agreement (SLA) data associated with a batch of applications, simultaneously monitoring jobs associated with the batch of applications for error conditions with respect to one or more of the schedule data or the SLA data, wherein the jobs associated with the batch of applications include one or more of mainframe jobs, operating system jobs or connection jobs, and generating an application status report and a failed job report based on the error conditions.

DRAWINGS

The various advantages of the exemplary embodiments will become apparent to one skilled in the art by reading the following specification and appended claims, and by referencing the following drawings, in which:

FIG. 5B is an illustration of an example of a lookup file according to an embodiment;

FIG. 6A is an illustration of an example of an application status report according to an embodiment;

FIG. 6B is an illustration of an example of a failed job report according to an embodiment;

DETAILED DESCRIPTION

Figure 1:
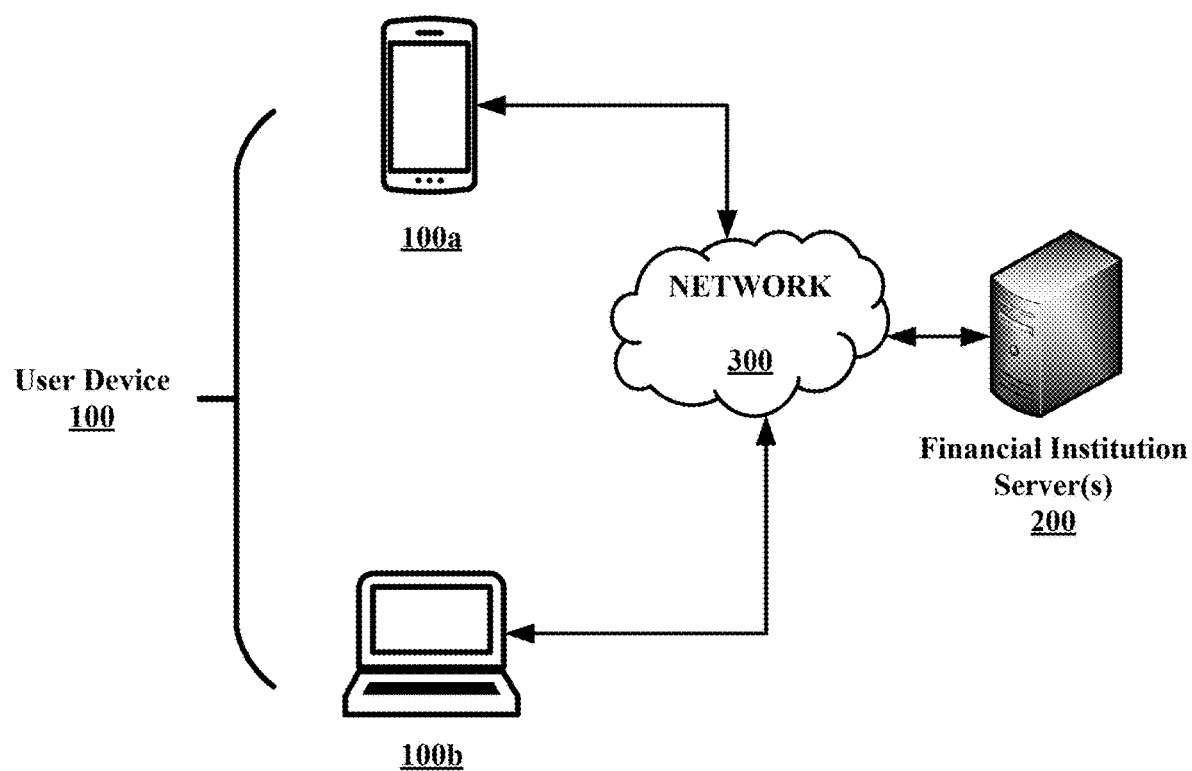
FIG. 1 illustrates a communication environment in accordance with one or more embodiments set forth and described herein.

Turning to the figures, in which FIG. 1 illustrates a communication environment in which a user communicates with a financial institution. A user device 100 (100a, 100b) operating in the communication environment facilitates user access to and user management of one or more user accounts residing at one or more financial institution servers 200 of the financial institution. The communication environment includes the user device 100, the one or more financial institution servers 200, and a communications network 300 through which communication is facilitated between the user device 100 and the one or more financial institution servers 200.

In accordance with one or more embodiments, the user device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or microelectromechanical device for processing and communicating data. This disclosure contemplates the user device 100 comprising any form of electronic device that optimizes the performance and functionality of the one or more embodiments in a manner that falls within the spirit and scope of the principles of this disclosure.

Figure 2:
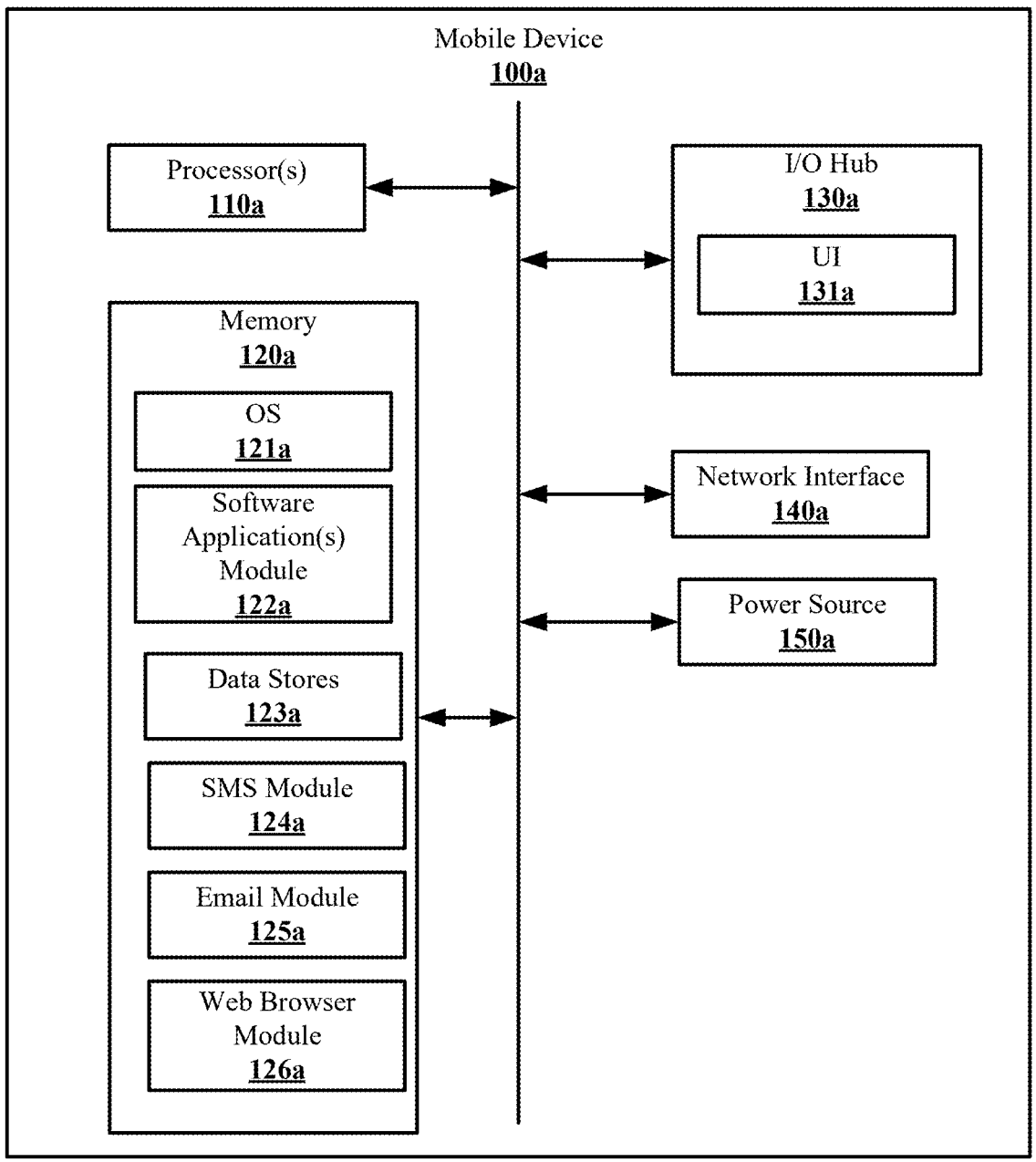
FIG. 2 illustrates a block diagram of the mobile device of FIG. 1.

In the illustrated example embodiment of FIG. 2, the user device 100 (FIG. 1) comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause the one or more processors 110a to execute an operating system (OS) 121a and one or more software applications of a software application module 122*a* that reside in the memory 120*a*. The one or more software applications residing in the memory 120*a* includes, but is not limited to, a financial institution application that is associated with the financial institution servers 200 (FIG. 1) and which facilitates user access to the one or more user accounts in addition to user management of the one or more user accounts. The financial institution application comprises a mobile financial institution application that facilitates establishment of a secure connection between the mobile device 100*a* and the one or more financial institution servers 200 (FIG. 1).

The memory 120*a* also includes one or more data stores 123*a* that are operable to store one or more types of data. The mobile device 100*a* may include one or more interfaces that facilitate one or more systems or modules thereof to transform, manage, retrieve, modify, add, or delete, the data residing in the data stores 123*a*. The one or more data stores 123*a* may comprise volatile and/or non-volatile memory. Examples of suitable data stores 123*a* include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 123*a* may be a component of the one or more processors 110*a*, or alternatively, may be operatively connected to the one or more processors 110*a* for use thereby. As set forth, described, and/or illustrated herein, "operatively connected" may include direct or indirect connections, including connections without direct physical contact.

The memory 120*a* also includes an SMS (short messaging service) module 124*a* operable to facilitate user transmission and receipt of text messages via the mobile device 100*a* though the network 300 (FIG. 1). In one example embodiment, a user may receive text messages from the financial institution that are associated with the user access and the user management of the one or more user accounts. An email module 125*a* is operable to facilitate user transmission and receipt of email messages via the mobile device 100*a* through the network 300 (FIG. 1). In one example embodiment, a user may receive email messages from the financial institution that are associated with the user access and the user management of the one or more user accounts. A user may utilize a web browser module 126*a* that is operable to facilitate user access to one or more websites associated with the financial institution through the network 300 (FIG. 1).

In accordance with one or more embodiments, the mobile device 100*a* includes an I/O hub 130*a* operatively connected to other systems and subsystems of the mobile device 100*a*. The I/O hub 130*a* may include one or more of an input interface, an output interface, and a network controller to facilitate communications between the user device 100 and the server 200 (FIG. 1). The input interface and the output interface may be integrated as a single, unitary user interface 131*a*, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110*a* to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100*a* may serve as both a component of the input interface and a component of the output interface.

The mobile device 100*a* includes a network interface 140*a* operable to facilitate connection to the network 300. The mobile device 100*a* also includes a power source 150*a* that comprises a wired powered source, a wireless power source, a replaceable battery source, or a rechargeable battery source.

Figure 3:
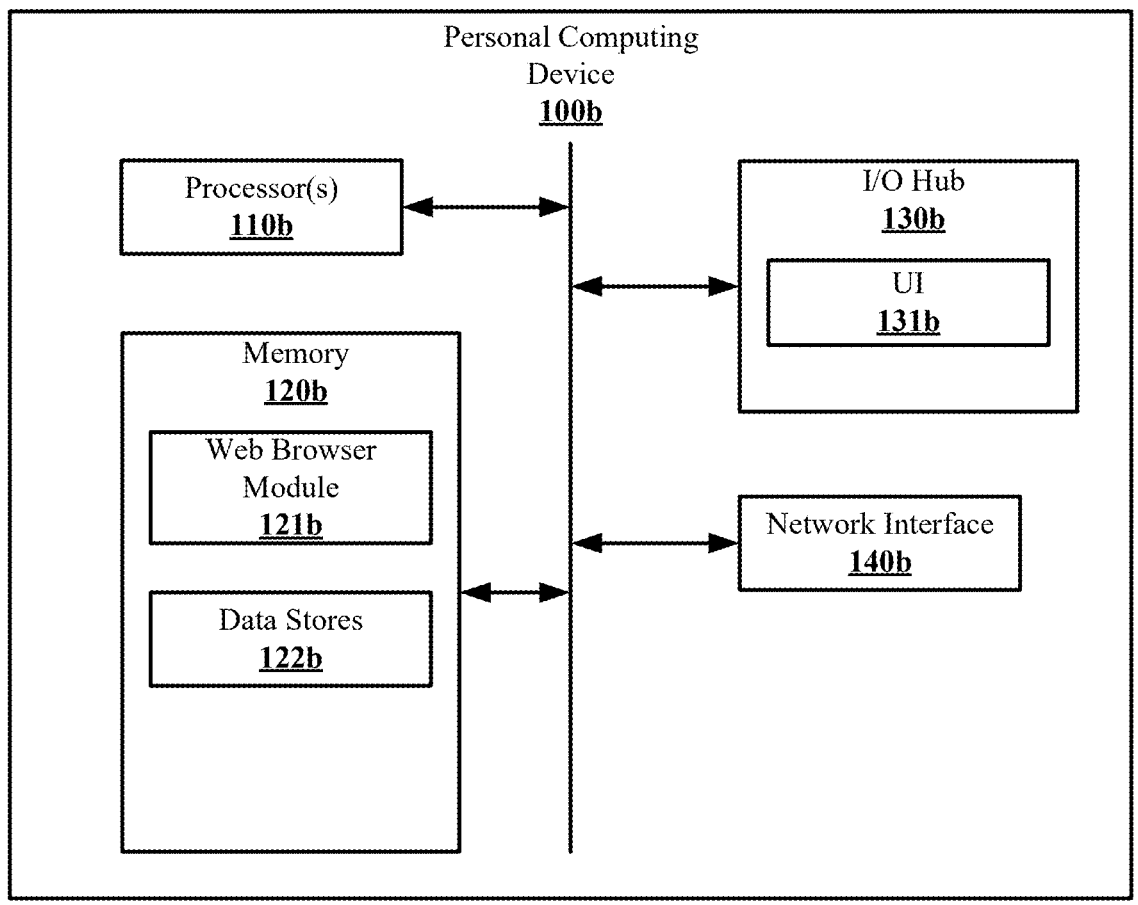
FIG. 3 illustrates a block diagram of the personal computing device of FIG. 1.

In the illustrated example embodiment of FIG. 3, the user device 100 (FIG. 1) comprises a personal computing device 100*b*. Some of the possible operational elements of the personal computing device 100*b* are illustrated in FIG. 3 and will now be described herein. It will be understood that it is not necessary for the personal computing device 100*b* to have all the elements illustrated in FIG. 3. For example, the personal computing device 100*b* may have any combination of the various elements illustrated in FIG. 3. Moreover, the personal computing device 100*b* may have additional elements to those illustrated in FIG. 3.

The personal computing device 100*b* includes one or more processors 110*b*, a non-transitory memory 120*b* operatively coupled to the one or more processors 110*b*, an I/O hub 130*b*, and a network interface 140*b*. The I/O hub 130*b* may include one or more of an input interface, an output interface, and a network controller to facilitate communications between the user device 100 and the server 200 (FIG. 2). The input interface and the output interface may be integrated as a single, unitary user interface 131*b*, or alternatively, be separate as independent interfaces that are operatively connected.

The memory 120*b* comprises a set of instructions of computer-executable program code. The set of instructions are executable by the one or more processors 110*b* to cause the one or more processors 110*b* to control the web browser module 121*b* in a manner that facilitates user access to a web browser having one or more websites associated with the financial institution through the network 300.

The memory 120*b* also includes one or more data stores 122*b* that are operable to store one or more types of data. The personal computing device 100*b* may include one or more interfaces that facilitate one or more systems or modules thereof to transform, manage, retrieve, modify, add, or delete, the data residing in the data stores 122*b*. The one or more data stores 122*a* may comprise volatile and/or non-volatile memory. Examples of suitable data stores 122*b* include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 122*b* may be a component of the one or more processors 110*b*, or alternatively, may be operatively connected to the one or more processors 110*b* for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 110*a* (FIG. 2), 110*b* may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110*a* (FIG. 2), 110*b* may comprise at least one hardware circuit (e.g., an integrated circuit) operable to carry out instructions contained in program code. In embodiments in which there is a plurality of processors, such processors may work independently from each other, or one or more processors may work in combination with each other.

Figure 4:
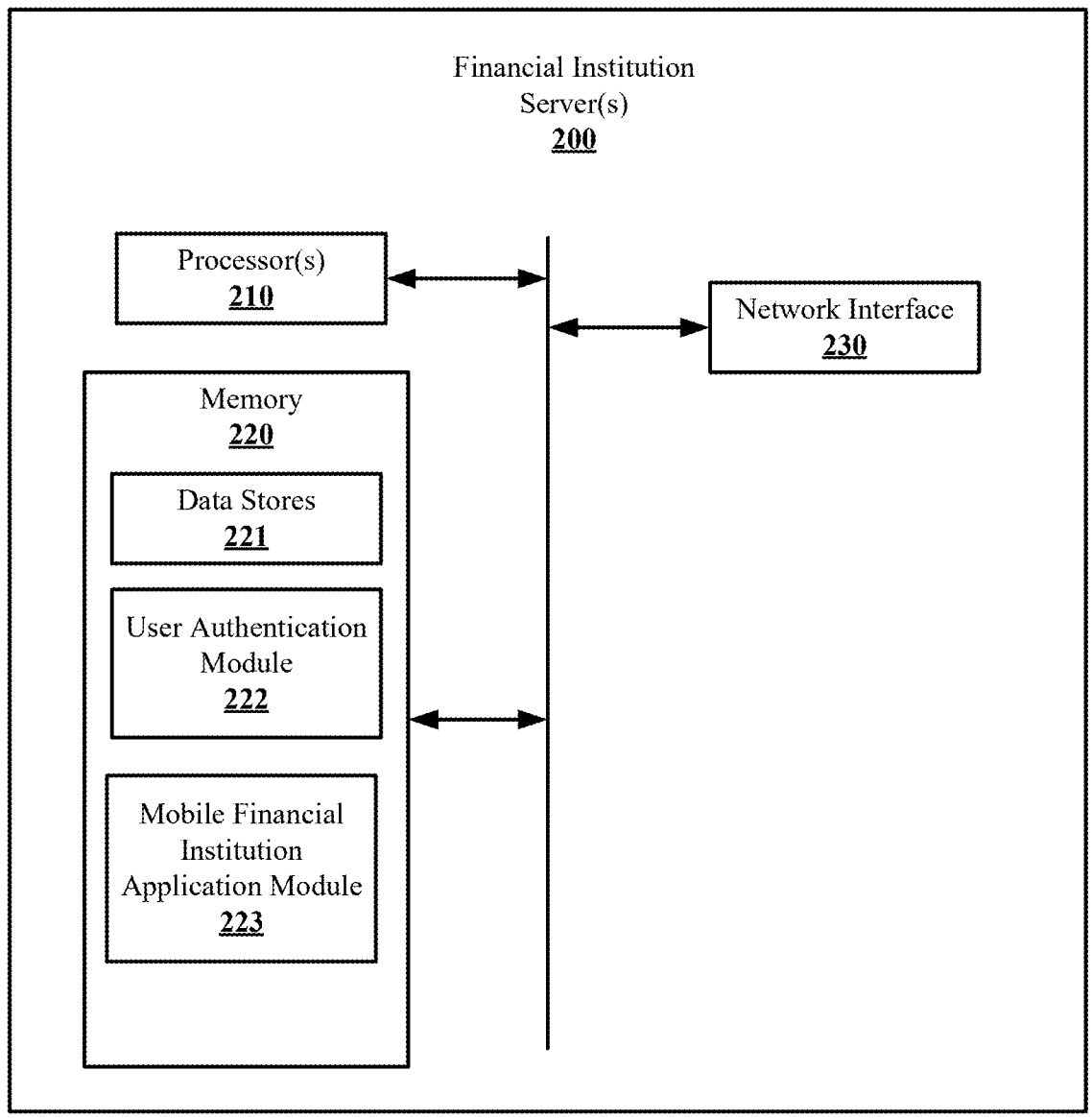
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, and a network interface 230. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The memory 220 comprises a set of instructions of computer-executable program code. The set of instructions are executable by the one or more processors 210 in manner that facilitates control of a user authentication module 222 and a mobile financial institution application module 223 having one or more mobile financial institution applications that reside in the memory 220.

The memory 220 also includes one or more data stores 221 that are operable to store one or more types of data, including but not limited to, user account data and user authentication data. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The computer-executable program code may instruct the one or more processors 210 to cause the user authentication module 222 to authenticate a user in order to gain user access to the one or more user accounts. The user authentication module 222 may be caused to request user input user data or user identification that include, but are not limited to, user identity (e.g., user name), a user passcode, a cookie, user biometric data, a private key, a token, and/or another suitable authentication data or information.

The computer-executable program code of the one or more mobile financial institution applications of the mobile financial institution application module 223 may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 223 are operable to communicate with the user device 100 (FIG. 1) in a manner which facilitates user access to the one or more user accounts in addition to user management of the one or more user accounts based on successful user authentication.

In accordance with one or more embodiments set forth, described, and/or illustrated herein, the network 300 (FIG. 1) may comprise a wireless network, a wired network, or any suitable combination thereof. For example, the network 300 (FIG. 1) is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

Figure 5A:
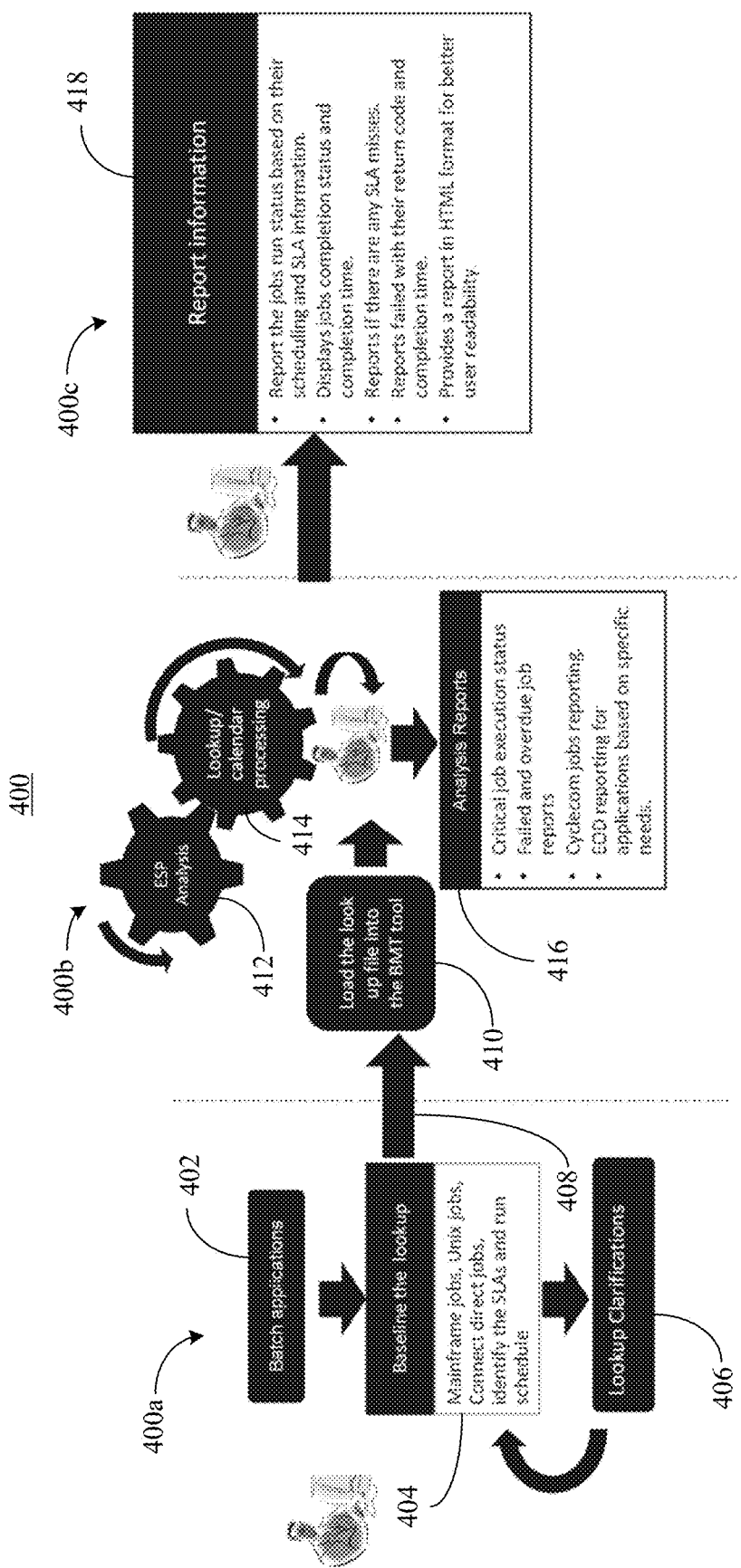
FIG. 5A is an illustration of an example of batch monitoring tool stages according to an embodiment.

Turning now to FIG. 5A, a batch monitoring tool 400 (400*a*-400*c*) is shown in which a first stage 400*a* identifies a batch of applications 402 (e.g., critical path applications) in response to a lookup request that identifies the applications 402 based on application type (e.g., reconciliation, payments, receivables, automated clearing house/ACH, etc.). Accordingly, two or more applications 402 in the batch can be different from one another. A baseline component 404 of the first stage 400*a* initiates lookup clarifications 406 to identify the jobs associated with the batch of applications 402, as well as service level agreement (SLA) data and schedule data associated the batch of applications 402. In an embodiment, the jobs associated with the batch of applications 402 include mainframe jobs (e.g., jobs/tasks executing on a mainframe computer), operating system (OS, e.g., UNIX) jobs, connection jobs (e.g., jobs/tasks connecting to other systems and/or subsystems), etc., or any combination thereof. The baseline component 404 generates a lookup file 408 based on the jobs associated with the batch of applications 402, the schedule data, and the SLA data.

FIG. 5B shows an example of the lookup file 408. In the illustrated example, the lookup file 408 contains fields for Job Name, Time and Schedule of Run, Time Run and Job Description. The Time and Schedule of Run field accommodates data for a time range (e.g., 07:00 to 07:15), day of the week (e.g., SAT, SUN, MON), frequency (e.g., yearly) and placeholders for future reference.

In one example, an interface 410 of a second stage 400*b* loads the lookup file into the batch monitoring tool (BMT). An enterprise scheduler platform (ESP) analysis component 412 and a processing subsystem 414 communicate to simultaneously monitor the jobs associated with the batch of applications 402 based on the lookup file 408 for error conditions with respect to the schedule data and/or the SLA data. As will be discussed in greater detail, the error conditions may include a failure of a job, an overdue status of a job, a delayed status of a job, etc., or any combination thereof. Moreover, the second stage 400b may extract calendar data from the ESP and bypass simultaneous monitoring of the jobs associated with the batch of applications 402 during one or more holidays reflected in the calendar data (e.g., obviating any need to manually setup the monitoring calendar each year).

In an embodiment, analysis reports 416 generated by the second stage 400b can detail critical job execution status, failed and overdue job statuses, periodic (e.g., "Cyclecom") statuses, end of day (EOD) statuses, and so forth. A third stage 400c outputs report information 418. The report information 418 may detail job run statuses based on the schedule data and SLA data, job completion status, SLA deviations/violations, failed statuses (e.g., including failure codes), etc., or any combination thereof. In an embodiment, the report information 418 is generated in HTML (hypertext markup language) for better user readability. Additionally, the report information 418 can be generated instantaneously in response to an event (e.g., critical failure alert) or on a cumulative/periodic basis (e.g., hourly).

The batch monitoring tool 400 therefore provides the ability to detect and report errors that cannot practically be monitored in real-time (e.g., on-the-fly) due to batch size (e.g., thousands of jobs per batch) and the concurrent execution nature of the batch of applications 402. Indeed, the report information 418 is substantially more accurate and detailed than any manually-achievable solution (e.g., eliminating missed incidents/failures) and the speed at which the report information 418 is generated is much faster than conventional solutions, which enables more timely responses to potentially critical errors/alerts. The batch monitoring tool 400 also has modular stages 400a-400c that may readily be detached/changed, which enables reporting formats to be modified with minimal effort. In addition, jobs can be easily added to the lookup file 408.

FIG. 6A shows an application status report 420 that is automatically generated by a batch monitoring tool such as, for example, the batch monitoring tool 400 (FIG. 5), already discussed. The application status report 420 includes fields for the application name, application identifier (ID), running status, failures and comments. In the illustrated example, the batch of applications includes reconciliation applications, payment applications, receivables applications, ACH applications, and so forth. The illustrated application status report 420 contains details for total reconciliation (TRECS), controlled process reconciliation (CPR), treasury manager (TM), online courier (OLC), online remote deposit (ORD), and so forth. Other fields may also be incorporated into the application status report 420.

FIG. 6B shows a failed jobs report 422 that is automatically generated by a batch monitoring tool such as, for example, the batch monitoring tool 400 (FIG. 5), already discussed. The failed jobs report 422 includes fields for the job name, application name, application ID, return code (e.g., failure code), and end time. Other fields may also be incorporated into the failed jobs report 422.

Figure 7:
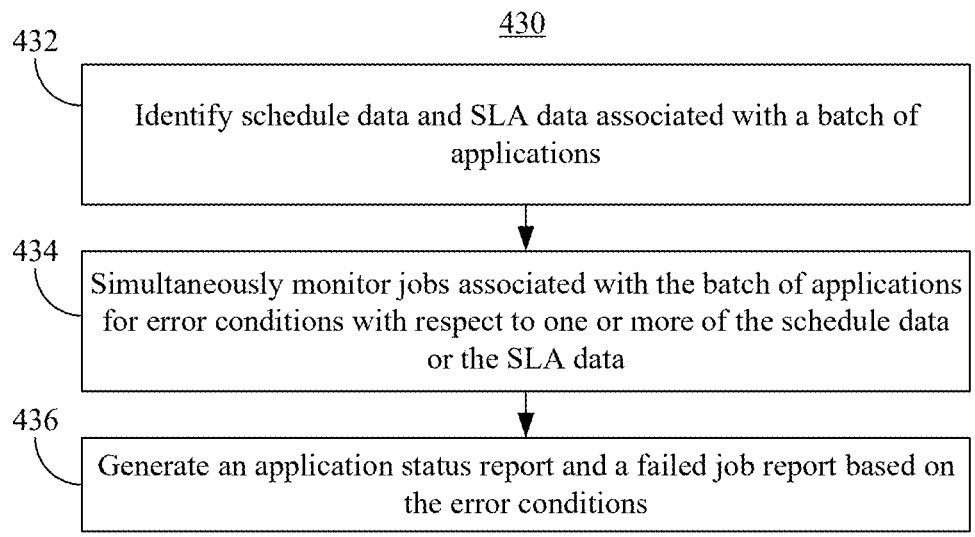
FIG. 7 is a flowchart of an example of a computer-implemented method of operating a performance-enhanced computing system according to an embodiment.

FIG. 7 shows a computer-implemented method 430 of operating a performance-enhanced computing system. The computer-implemented method 430 may generally be implemented in a server such as, for example, the financial institution server(s) 200 (FIGS. 1 and 4), already discussed. More particularly, the computer-implemented method 430 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Computer program code to carry out operations shown in the computer-implemented method 430 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 432 provides for identifying (e.g., in response to a lookup request) schedule data and SLA data associated with a batch of applications. As already noted, two or more of the applications in the batch may be different from one another. Block 434 simultaneously monitors jobs associated with the batch of applications for error conditions with respect to one or more of the schedule data or the SLA data. In an embodiment, block 434 includes generating a lookup file based on the jobs associated with the batch of applications, the schedule data, and the SLA data, wherein the jobs associated with the batch of applications are simultaneously monitored based on the lookup file. The jobs may include mainframe jobs, OS jobs, connection jobs, etc., or any combination thereof.

In one example, the error conditions include a failure of a job. In such a case, block 434 detects a failure code associated with the job. In another example, the error conditions include an overdue status of a job, wherein block 434 involves detecting that the job has failed to start (e.g., in accordance with a start time indicated in the schedule data and/or SLA data). In yet another example, the error conditions include a delayed status of a job. In such a case, block 434 might detect that the job has failed to complete (e.g., in accordance with a completion time reflected in the schedule data and/or SLA data). Block 436 generates an application status report such as, for example, the application status report 420 (FIG. 6A) and a failed job report such as, for example, the failed jobs report 422 (FIG. 6B), based on the error conditions.

The computer-implemented method 430 therefore enhances performance at least to the extent that simultaneously monitoring the jobs provides the ability to detect and report errors that cannot practically be monitored in real-time (e.g., on-the-fly) due to batch size (e.g., thousands of jobs per batch) and the concurrent execution nature of the batch of applications. Indeed, the report information reflected in the application status report and the failed job report is substantially more accurate and detailed than any manually-achievable solution (e.g., eliminating missed incidents/failures) and the speed at which the report information is generated is much faster than conventional solutions, which enables more timely responses to potentially critical errors/alerts. The computer-implemented method 430 may also be implemented in modular stages that are readily detached/changed, which enables reporting formats to be modified with minimal effort. In addition, jobs can be easily added to the lookup file as appropriate.

Figure 8:
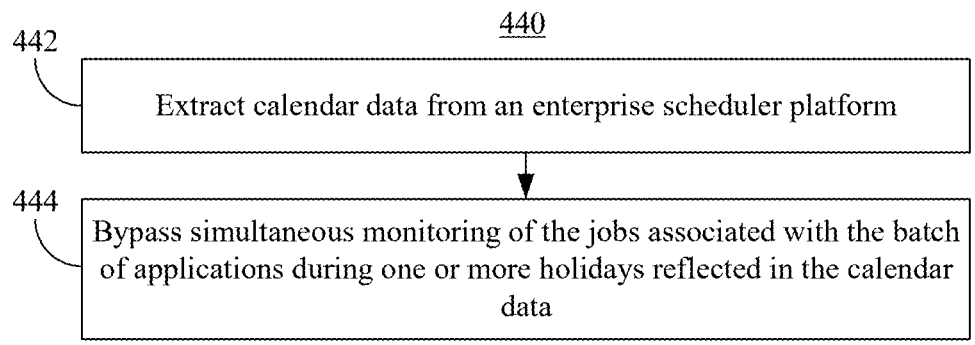
FIG. 8 is a flowchart of an example of a computer-implemented method of simultaneously monitoring jobs associated with a batch of applications for error conditions according to an embodiment.

FIG. 8 shows a computer-implemented method 440 of simultaneously monitoring jobs associated with a batch of applications. The computer-implemented method 440 may generally be implemented in a server such as, for example, the financial institution server(s) 200 (FIGS. 1 and 4), already discussed. Additionally, the computer-implemented method 440 may be readily incorporated into block 434 (FIG. 7), already discussed. More particularly, the computer-implemented method 440 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof.

Illustrated processing block 442 extracts calendar data from an enterprise scheduler platform (ESP). Block 444 bypasses monitoring of the jobs associated with the batch of application during one or more holidays (e.g., federal, state and/or local holidays) reflected in the calendar data. The computer-implemented method 440 therefore further enhances performance at least to the extent that automatically determining the holiday(s) and bypassing simultaneous monitoring during the holiday(s) reduces processing overhead, power consumption and/or system latency.

Figure 9:
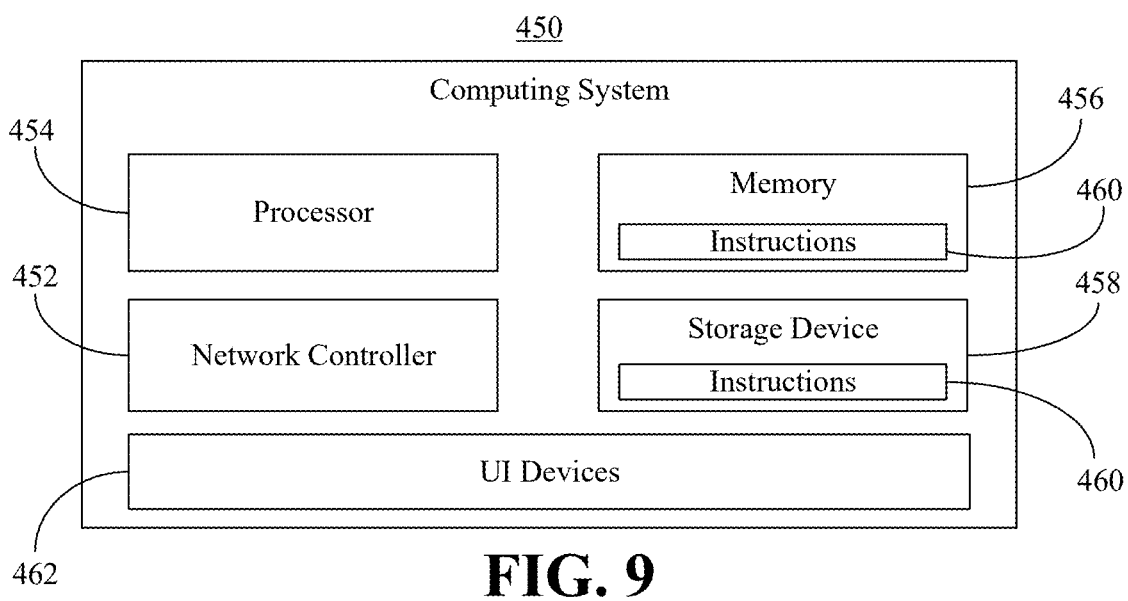
FIG. 9 is a block diagram of an example of a performance-enhanced computing system according to an embodiment.

FIG. 9 shows a server 450 (e.g., computing system) that includes a network controller 452 (e.g., wired, wireless), a processor 454 (e.g., host processor, central processing unit/CPU), a volatile memory 456 (DRAM), and mass storage 458 (e.g., storage device, flash memory, optical disc, hard disk drive/HDD, solid state drive/SDD). In the illustrated example, the processor 454 executes instructions 460 retrieved from the volatile memory 456 and/or the mass storage 458 to conduct one or more aspects of the computer-implemented method 430 (FIG. 7) and/or the computer-implemented method 440 (FIG. 8), already discussed. Thus, execution of the instructions 460 causes the processor 454 to identify schedule data and SLA data associated with a batch of applications, simultaneously monitor jobs associated with the batch of applications for error conditions with respect to one or more of the schedule data or the SLA data, and generate an application status report and a failed jobs report based on the error conditions. In an embodiment, the application status report and the failed jobs report are output via one or more UI devices 462 and/or the network controller 452.

The server 450 is therefore considered performance-enhanced at least to the extent that simultaneously monitoring the jobs provides the ability to detect and report errors that cannot practically be monitored in real-time (e.g., on-the-fly) due to batch size (e.g., thousands of jobs per batch) and the concurrent execution nature of the batch of applications. Indeed, the report information reflected in the application status report and the failed job report is substantially more accurate and detailed than any manually-achievable solution (e.g., eliminating missed incidents/failures) and the speed at which the report information is generated is much faster than conventional solutions, which enables more timely responses to potentially critical errors/alerts. The instructions 460 may also be implemented in modular stages that are readily detached/changed, which enables reporting formats to be modified with minimal effort. In addition, jobs can be easily added to the lookup file as appropriate.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A computing system, comprising:
 a network controller;
 a processor coupled to the network controller; and
 a memory coupled to the processor, the memory including
  a set of instructions, which when executed by the processor, cause the processor to:
   identify schedule data and service level agreement (SLA) data associated with a batch of computer-executable applications,
   generate a lookup file based on a plurality of individual jobs associated with the batch of computer-executable applications, the schedule data, and the SLA data, wherein the lookup file identifies the plurality of individual jobs for monitoring, and wherein at least some of the batch of computer-executable applications are to be executed concurrently, simultaneously monitor in real time, based on the lookup file, the plurality of individual jobs associated with the batch of computer-executable applications for error conditions with respect to one or more of the schedule data or the SLA data, bypass simultaneous monitoring of the plurality of individual jobs associated with the batch of computer-executable applications during one or more calendar events reflected in calendar data to reduce one or more of processing overhead, power consumption or system latency, and generate an application status report and a failed job report based on the error conditions.

2. The computing system of claim 1, wherein the error conditions are to include a failure of one of the plurality of individual jobs and the instructions, when executed, further cause the processor to detect a failure code associated with the one of the plurality of individual jobs.

3. The computing system of claim 1, wherein the error conditions are to include an overdue status of one of the plurality of individual jobs and the instructions, when executed, further cause the processor to detect that the one of the plurality of individual jobs has failed to start.

4. The computing system of claim 1, wherein the error conditions are to include a delayed status of one of the plurality of individual jobs and the instructions, when executed, further cause the processor to detect that the one of the plurality of individual jobs has failed to complete.

5. The computing system of claim 1, wherein the one or more calendar events includes one or more holidays, and wherein the instructions, when executed, further cause the processor to:

extract the calendar data from an enterprise scheduler platform.

6. The computing system of claim 1, wherein the plurality of individual jobs associated with the batch of computer-executable applications are to include one or more of mainframe jobs, operating system jobs or connection jobs.

7. The computing system of claim 1, wherein the failed job report is to be generated instantaneously in response to a critical failure alert, and wherein the instructions, when executed, further cause the processor to:

detect, in real time, return codes associated with execution of the plurality of individual jobs.

8. At least one computer readable storage medium comprising a set of instructions, which when executed by a computing system, cause the computing system to:

identify schedule data and service level agreement (SLA) data associated with a batch of computer-executable applications;

generate a lookup file based on a plurality of individual jobs associated with the batch of computer-executable applications, the schedule data, and the SLA data, wherein the lookup file identifies the plurality of individual jobs for monitoring, and wherein at least some of the batch of computer-executable applications are to be executed concurrently, simultaneously monitor in real time, based on the lookup file, the plurality of individual jobs associated with the batch of computer-executable applications for error conditions with respect to one or more of the schedule data or the SLA data;

bypass simultaneous monitoring of the plurality of individual jobs associated with the batch of computer-executable applications during one or more calendar events reflected in calendar data to reduce one or more of processing overhead, power consumption or system latency, and generate an application status report and a failed job report based on the error conditions.

9. The at least one computer readable storage medium of claim 8, wherein the error conditions are to include a failure of one of the plurality of individual jobs and the instructions, when executed, further cause the computing system to detect a failure code associated with the one of the plurality of individual jobs.

10. The at least one computer readable storage medium of claim 8, wherein the error conditions are to include an overdue status of one of the plurality of individual jobs and the instructions, when executed, further cause the computing system to detect that the one of the plurality of individual jobs has failed to start.

11. The at least one computer readable storage medium of claim 8, wherein the error conditions are to include a delayed status of one of the plurality of individual jobs and the instructions, when executed, further cause the computing system to detect that the one of the plurality of individual jobs has failed to complete.

12. The at least one computer readable storage medium of claim 8, wherein the one or more calendar events includes one or more holidays, and wherein the instructions, when executed, further cause the computing system to:

extract the calendar data from an enterprise scheduler platform.

13. The at least one computer readable storage medium of claim 8, wherein the plurality of individual jobs associated with the batch of computer-executable applications are to include one or more of mainframe jobs, operating system jobs or connection jobs.

14. The at least one computer readable storage medium of claim 8, wherein the failed job report is to be generated instantaneously in response to a critical failure alert, and wherein the instructions, when executed, further cause the computing system to:

detect, in real time, return codes associated with execution of the plurality of individual jobs.

15. A computer-implemented method, comprising:

identifying schedule data and service level agreement (SLA) data associated with a batch of computer-executable applications;

generating a lookup file based on a plurality of individual jobs associated with the batch of computer-executable applications, the schedule data, and the SLA data, wherein the lookup file identifies the plurality of individual jobs for monitoring, and wherein at least some of the batch of computer-executable applications are executed concurrently, simultaneously monitoring in real time, based on the lookup file, the plurality of individual jobs associated with the batch of computer-executable applications for error conditions with respect to one or more of the schedule data or the SLA data, wherein the plurality of individual jobs associated with the batch of computer-executable applications include one or more of mainframe jobs, operating system jobs or connection jobs;

bypassing simultaneous monitoring of the plurality of individual jobs associated with the batch of computer-executable applications during one or more calendar events reflected in calendar data to reduce one or more of processing overhead, power consumption or system latency, and generating an application status report and a failed job report based on the error conditions.

16. The computer-implemented method of claim 15, wherein the error conditions include a failure of one of the plurality of individual jobs and the method further includes detecting a failure code associated with the one of the plurality of individual jobs.

17. The computer-implemented method of claim 15, wherein the error conditions include an overdue status of one of the plurality of individual jobs and the method further includes detecting that the one of the plurality of individual jobs has failed to start.

18. The computer-implemented method of claim 15, wherein the error conditions include a delayed status of one of the plurality of individual jobs and the method further includes detecting that the one of the plurality of individual jobs has failed to complete.

19. The computer-implemented method of claim 15, further including:

extracting the calendar data from an enterprise scheduler platform, wherein the one or more calendar events includes one or more holidays.

20. The computer-implemented method of claim 15, wherein the failed job report is generated instantaneously in response to a critical failure alert, and wherein the method further comprises:

detecting, in real time, return codes associated with execution of the plurality of individual jobs.

* * * * *